(12) United States Patent
Goldrian et al.

(10) Patent No.: US 6,909,710 B1
(45) Date of Patent: Jun. 21, 2005

(54) METHOD OF OPERATING A BUFFERED CROSSBAR SWITCH

(75) Inventors: Gottfried Andreas Goldrian, Boeblingen (DE); Bernd Leppla, Buchen-Bodeigheim (DE); Norbert Schumacher, Neuhausen (DE)

(73) Assignee: International Business Machines Corporation, Armonk, NY (US)

( * ) Notice: Subject to any disclaimer, the term of this patent is extended or adjusted under 35 U.S.C. 154(b) by 83 days.

(21) Appl. No.: 10/331,369

(22) Filed: Dec. 30, 2002

(30) Foreign Application Priority Data

Jan. 3, 2002 (EP) .............................................. 02000020

(51) Int. Cl.⁷ ........................ H04L 12/66; H04L 12/50; G06F 12/00
(52) U.S. Cl. ........................ 370/352; 370/379; 711/153
(58) Field of Search ................................. 370/230, 401, 370/432, 426, 363, 368, 371, 374, 378, 379, 381, 382, 383, 386, 387, 389, 392, 412, 461, 416, 413; 711/153

(56) References Cited

U.S. PATENT DOCUMENTS

| 5,838,684 A | * | 11/1998 | Wicki et al. ................. 370/416 |
| 6,351,466 B1 | * | 2/2002 | Prabhakar et al. ........... 370/413 |
| 6,449,283 B1 | * | 9/2002 | Chao et al. .................. 370/461 |

* cited by examiner

Primary Examiner—Alpus H. Hsu
Assistant Examiner—Lee Khuong
(74) Attorney, Agent, or Firm—John E. Campbell; Floyd A. Gonzalez

(57) ABSTRACT

The present invention relates to a method of operating a buffered crossbar switch. The proposed method reduces power dissipation in a buffered crossbar switch by reducing the number of crossbar buffer write processes.

8 Claims, 3 Drawing Sheets

METHOD OF OPERATING A BUFFERED CROSSBAR SWITCH

BACKGROUND OF THE INVENTION

The present invention relates to a method of operating a buffered crossbar switch.

Crossbar switches connect a plurality of input/output ports one to another. Packets arriving at one of the input ports are routed to specified output ports. The most common routing operations—also referred to as connections in the further description—within a crossbar switch comprise routing an incoming packet to just one output port (unicast) and routing an incoming packet to all output ports (broadcast). There is a third routing operation called multicast, which comprises routing an incoming packet to multiple, specified output ports.

State of the art crossbar switches can handle multiple concurrent connections. These crossbar switches require crossbar buffers for temporarily storing blocked packets, i.e. packets that cannot be routed to the specified output port instantly. For example, such a problem occurs if multiple connections require a specific output port at the same time.

There are various design approaches for crossbar buffer structures aimed at non-blocking crossbar switches. One approach is the so-called input queuing, a variant of which is providing crossbar buffers at each input port. Another approach is output queuing, wherein packets destined for the same output port are stored in a crossbar buffer dedicated to said output port.

In the further description, a buffered crossbar switch architecture comprising dedicated crossbar buffers for each connection of an input port to an output port is referred to. This architecture can be interpreted as a combination of said input/output queuing techniques and serves well for explaining general crossbar operation with respect to the present invention.

FIG. 1 shows a section of a buffered crossbar switch based on the above mentioned architecture, comprising 4 input ports, i1, i2, i3, i4 and four output ports o1, o2, o3, o4.

Each input port is connected to a corresponding input crossbar 7, whereas each output port is connected to a corresponding output crossbar 8.

An intersection of an input crossbar 7 with an output crossbar 8 is called crosspoint and is characterized by a dedicated crossbar buffer 5, 6 consisting of a buffer control 5 and a buffer memory 6.

Buffered crossbar switches are frequently used in multiprocessor computer systems with distributed memory architecture e.g. for linking processors with resources such as cache memory and other subsystems, or internet switch networks and similar high-performance communication networks.

The bit rate demands of these applications cannot be satisfied with a single buffered crossbar switch in many cases. Prior art has attempted to solve this problem by providing scalable buffered crossbar switches that can advantageously be combined to form an expanded crossbar switch. This mode of operation is referred to as expansion mode.

An expanded crossbar switch is characterised by a port-width that is a multiple of the port-width of a single scalable buffered crossbar switch. For example, an expanded crossbar switch consisting of four single scalable buffered crossbar switches each having a port width of 8 bit can handle 32 bit-data at each port thus quadrupling throughput as compared to a single scalable buffered crossbar switch.

Internal operation of an expanded crossbar switch is such that incoming packets are divided into smaller portions each of which is processed by one scalable buffered crossbar switch.

To ensure proper synchronization of scalable buffered crossbar switches in expansion mode, one of them is determined to be the master switch. Said master switch is connected to the remaining switches, the slave switches, via an external bus system.

There are various constraints for the amount of data to be transmitted over said external bus system in state of the art expanded crossbar switches, the most important being the high bit rate.

Nevertheless, since only said master switch receives the header portion of an incoming packet containing routing information, it is necessary to provide said slave switches with said routing information so that incoming packets can correctly be assigned to the corresponding output port(s)/buffer(s) in the slave switches, too.

The prior art approach to reduce the amount of data to be transmitted to said slave switches via said external bus system consists in reducing said routing information that is passed over from said master switch to said slave switches.

Switches that do not provide multicast operations can accomplish said reduction by binary coding of the respective output port/buffer in the case of unicasts and by providing just one additional status bit for indicating broadcasts.

However, for indicating multiple, specified output ports as required with multicasts, a bit-mask type representation of the output ports is necessary. For example, a bit-mask for a switch having 32 output ports comprises 32 bits. If a certain port is selected for output, the corresponding bit has to be set, otherwise, it has to be cleared. Hence, with multicasts, a wide variety of bit patterns is possible within the bit-mask.

Since said bit-mask is inevitable for multicast operations, it is also used for specifying unicast and broadcast operations in switches providing multicasts.

Thus, in order to reduce the amount of data of the bit-mask, that has to be transmitted from the master to the slaves, with unicast operations, an incoming packet is routed in a so-called auxiliary broadcast go each crossbar buffer connected to the respective input port by an input crossbar, i.e. after said auxiliary broadcast, said incoming packet is available at each output port. However, only one of these crossbar buffers is connected to the output port designated as destination for said unicast.

Compared to a unicast operation which routes an incoming packet directly to the crossbar buffer connected to the desired output port, said auxiliary broadcast operation saves the portion of address information to pick one crossbar buffer out of the plurality of crossbar buffers connected to the respective input crossbar. For instance, a single status bit is sufficient for indicating said auxiliary broadcast.

The disadvantage of this method is the high power dissipation in a crossbar switch due to the high number of write operations necessary for the auxiliary broadcast.

For a unicast operation in a crossbar switch with N output ports, said state of the art method employing auxiliary broadcasts requires writing data to N crossbar buffers whereas only writing to one crossbar buffer would be necessary for completing said unicast operation.

Apart from that, the crossbar buffers are not used efficiently because for each auxiliary broadcast N crossbar buffers are loaded with packet data only one of which is intended to send said packet data to the corresponding output port.

With each auxiliary broadcast, N−1 crossbar buffers are filled by said auxiliary broadcast that could otherwise be used by following connections thus contributing to overall performance.

However, this only holds true for unicasts. If an incoming data packet is to be broadcast to all of the N output ports of a switch, N crossbar buffers must be used anyway.

Since practice has proven that overall packet traffic mainly consists of unicasts, the poor resource usage due to said auxiliary broadcast is yet an important issue.

SUMMARY OF THE INVENTION

Accordingly, it is an object of the present invention to provide a method of operating a crossbar switch with decreased power dissipation.

According to the present invention, this object is achieved by providing a method of operating a crossbar switch including a plurality of crossbar buffers, comprising the following steps:

a) receiving an incoming packet at an input port of one of said crossbar buffers, b) generating a reduced address information of said incoming packet, wherein said reduced address information allows to select a subset (S) from a plurality (N) of crossbar buffers connected to said input port, c) sending said incoming packet to said subset (S) of said crossbar buffers connected to said input port by using said reduced address information.

To avoid the disadvantage of writing an incoming packet to each crossbar buffer upon receiving it in step a), the method according to the invention comprises the step b) of generating a reduced address information based on the original address information of said incoming packet.

Said reduced address information is characterised by containing less information compared to said original address information. Yet it is sufficient for specifying a subset of crossbar buffers, wherein said subset comprises a plurality of crossbar buffers each of which is connected to said input port by the same input crossbar.

Once that said reduced address information has been generated, according to step c) said incoming packet can be sent to said subset of crossbar buffers. Since this operation is similar to a broadcast operation, it is referred to as "mini broadcast" in the further explanations.

The difference between an auxiliary broadcast and a mini broadcast is that with said auxiliary broadcast an incoming packet is written to each crossbar buffer connected to the respective input port whereas with said mini broadcast according to the invention the incoming packet is only written to a subset of crossbar buffers.

After such a mini broadcast, said incoming packet is stored in each crossbar buffer specified by said reduced address information, i.e. said subset of crossbar buffers. Hence it is available at each output port connected to one of said crossbar buffers by the respective output crossbar.

The mini broadcast according to the invention limits the number of crossbar buffers being accessed upon receiving an incoming unicast packet while requiring only few address information. In this way, power dissipation in a crossbar switch is reduced.

The number of crossbar buffers addressed within a mini broadcast depends on the degree of reduction of the original address within step b).

Another advantage of the method according to the invention is the possibility of using those crossbar buffers that are not part of said subset being addressed during a mini broadcast for following routing operations thereby increasing efficiency of resource usage.

The present invention further proposes a networking system having a plurality of buffered crossbar switches including a plurality of crossbar buffers, wherein said crossbar switches work in parallel and wherein said crossbar switches are controlled via an external bus system, said crossbar switches comprising:

means for receiving an incoming packet at an input port of one of said crossbar buffers, means for generating a reduced address information of said incoming packet, wherein said reduced address information allows to select a subset from said plurality of crossbar buffers connected to said input port, and means for sending said incoming packet to said subset of said crossbar buffers connected to said input port by using said reduced address information.

BRIEF DESCRIPTION OF THE DRAWINGS

These and other objects will be apparent to one skilled in the art from the following detailed description of the invention taken in conjunction with the accompanying drawings in which.

DESCRIPTION OF THE PREFERRED EMBODIMENT

Figure 1:
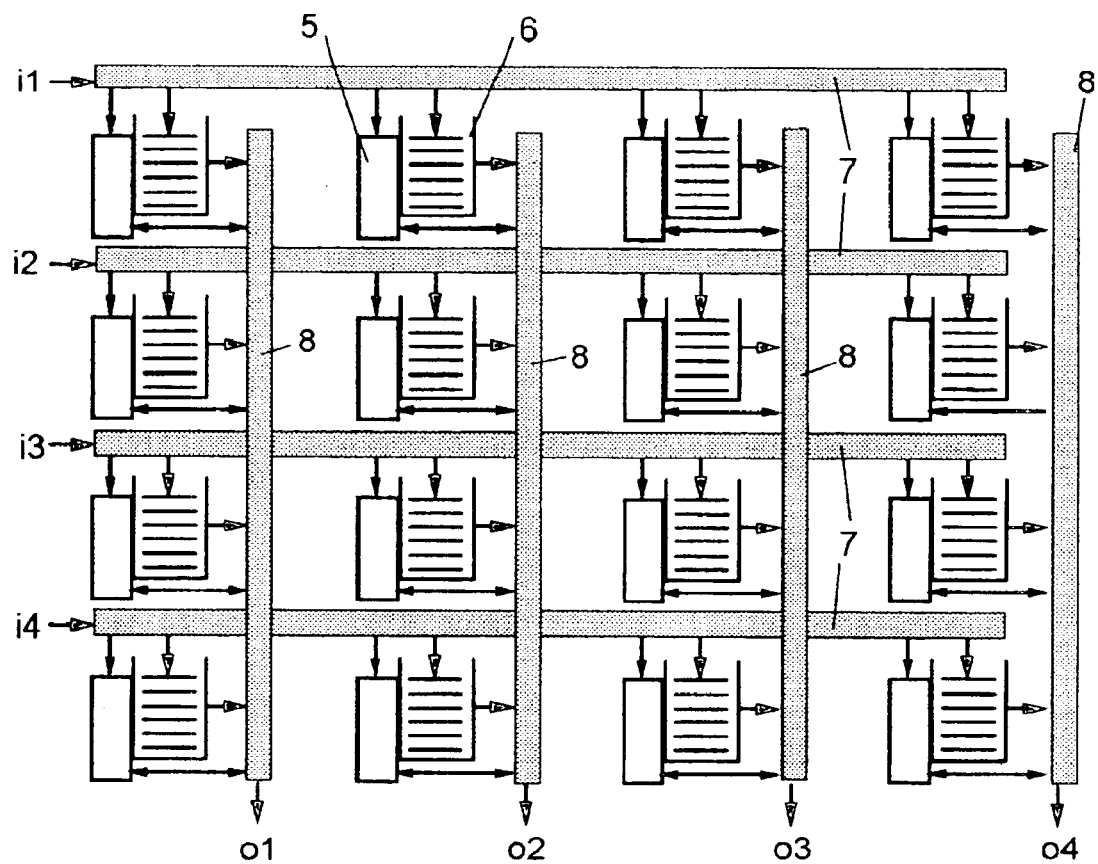
FIG. 1 shows a section of a buffered crossbar switch.

FIG. 1 shows a section of a typical buffered crossbar switch as already explained above.

Figure 2:
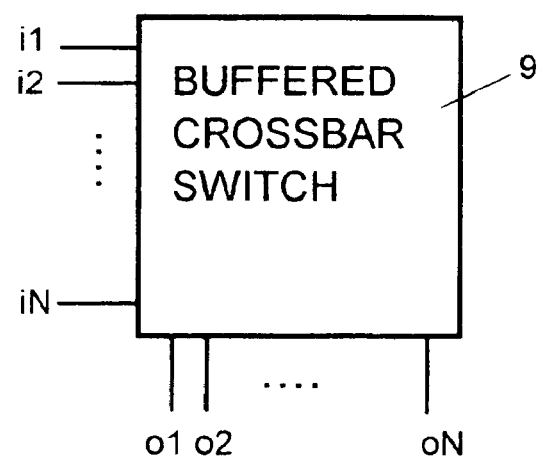
FIG. 2 shows a buffered crossbar switch.
Figure 4:
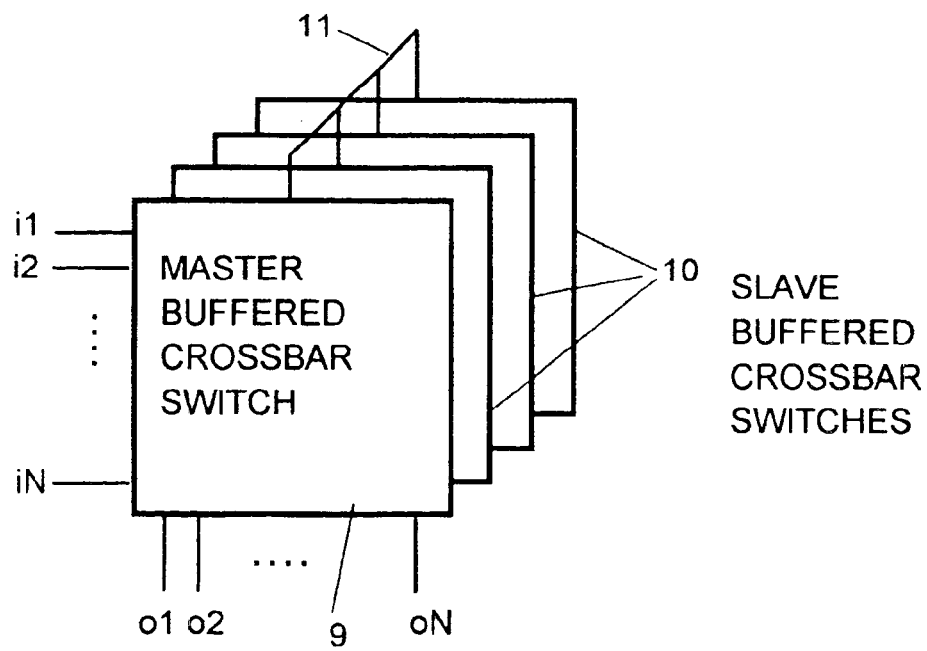
FIG. 4 shows four buffered crossbar switches operating in expansion mode.

A plurality of sections as depicted in FIG. 1 form the buffered crossbar switches 9, 10 of FIGS. 2, 4. They have N=32 input ports i1, . . . , i32 each and 32 output ports, o1, . . . , o32, too.

Each of the 32 input ports is connected to a corresponding input crossbar 7, whereas each of the 32 output ports is connected to a corresponding output crossbar 8.

An intersection of an input crossbar with an output crossbar is called crosspoint and is characterized by a dedicated crossbar buffer 5, 6 consisting of a buffer control 5 and a buffer memory 6.

Figure 3:
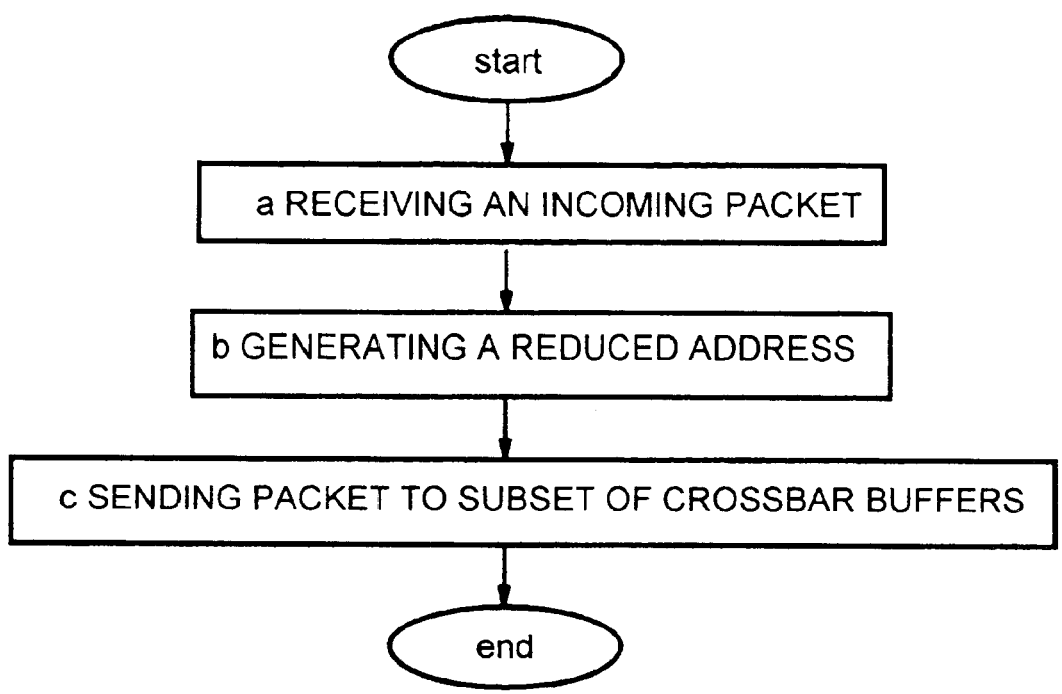
FIG. 3 shows a flowchart depicting the method according to the invention.

The method according to the invention is illustrated by the flowchart of FIG. 3 and will be explained in connection with FIG. 4.

FIG. 4 shows four crossbar switches 9, 10 working in parallel in expansion mode. A master switch 9 supplies three slave switches 10 with control information via an external bus 11.

Figure 5:
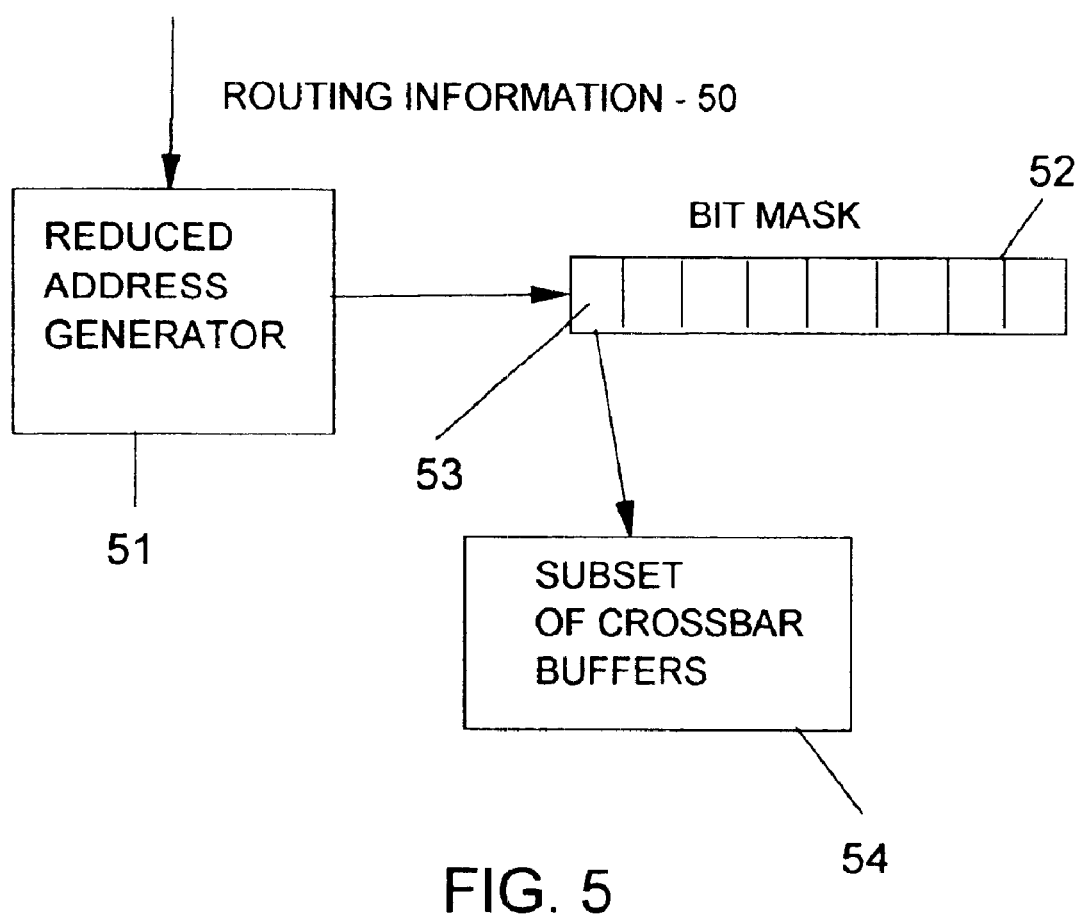
FIG. 5 shows a reduced address generator and a bit mask addressing a subset of crossbar buffers of the present invention.

The input/output ports of the switches 9, 10 are configured such that one switch receives one fourth of an incoming packet P, wherein the master switch 9 receives the header portion of the packet P that contains routing information (50 of FIG. 5).

I.e., with a given length of the packet P of 80 Bytes, the master switch receives a first portion of the packet P comprising the Bytes 1 . . . 20 of the packet P and containing said routing information 50 of FIG. 5. The first of the three slave switches receives the Bytes 21 . . . 40 of the packet P and so on.

In step a) of the method according to the invention, the packet P is arriving at e.g. input port i2 and is to be routed e.g. to output port oN.

To accomplish this, the master switch 9 extracts said routing information 50 from said first portion of the packet P. According to step b), the master switch 9 includes a reduced address generator 51 of FIG. 5 to generate a reduced address information based on said routing information.

For creating the reduced address information, the master switch 9 partitions the set of those 32 crossbar buffers, which are connected to the input port i2, into eight groups, group_1 to group_8.

Each group consists of four subsequent crossbar buffers, for instance group_1 comprises the crossbar buffers assigned to the input port i2 and the output ports o1, o2, o3, o4 and group_8 comprises the crossbar buffers assigned to the input port i2 and the output ports o29, o30, o31, o32.

The reduced address information according to the invention consists of the information necessary to distinguish between the eight groups of crossbar buffers.

For example, a binary coded reduced address information only needs 3 bit while a bit-mask type representation needs 8 bit to represent the eight groups of crossbar buffers.

To enable multicast operations, the bit-mask type representation is chosen. Hence, with the method according to the invention, reduced address information comprising a bit-mask 52 of 8 bits is generated out of a bit-mask of 32 bits.

Since the packet P is to be routed to o32 in the present example, the master switch 9 selects group_8 54 to be pointed to by the reduced address information in bit mask 52 by bit 53.

The reduced address information is then passed to the slave switches 10 via the external bus 11.

Finally, in step c) of the method according to the invention, the packet P is sent to the group_8 of crossbar buffers indicated by bit 53 with a mini broadcast by using said reduced address information of bit mask 52, wherein the master switch 9 and each of the three slave switches 10 processes one fourth of the packet P in the aforesaid manner.

As a result, the packet P is stored in the crossbar buffers assigned to the input port i2 and the output ports o29, o30, o31, o32 of each of the four crossbar switches 9, 10. Thus it is available at the desired output port o32.

In contrast to the state of the art auxiliary broadcasts, the mini broadcast requires only writing to 4 crossbar buffers, o29 to o32, instead of writing to 32 crossbar buffers, o1 to o32.

As a consequence, power dissipation is reduced and less buffers are occupied as compared to an auxiliary broadcast.

To compensate for processing- and transmission delays within the master/slave-system, configurable delay buffers between the output of the master switch 9 and the input of the slave switches 10 have to be provided.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A method of operating a buffered crossbar switch including a plurality of crossbar buffers, comprising the steps of:
    a) receiving an incoming packet at an input port of one of said crossbar buffers,
    b) generating a reduced address information of said incoming packet, wherein said reduced address information allows the selection of a subset from a plurality of crossbar buffers connected to said input port, wherein said reduced address information comprises a bit-mask, wherein a single bit of said bit-mask corresponds to a subset of crossbar buffers,
    c) sending said incoming packet to said subset of said crossbar buffers connected to said input port by using said reduced address information.

2. The method according to claim 1, wherein said buffered crossbar switch comprises 32 input ports and/or 32 output ports.

3. The method according to claim 1 wherein said subset comprises four adjacent crossbar buffers.

4. The method according to claim 1, wherein the number of output ports is a power of two.

5. A networking system comprising:
    a plurality of buffered crossbar switches working in parallel;
    a plurality of crossbar buffers;
    an external bus system controlling said crossbar switches;
    an input port receiving an incoming packet of one of said crossbar buffers;
    an address generator generating reduced address information of said incoming packet, wherein said reduced address information allows selection of a subset from said plurality of crossbar buffers connected to said input port, wherein said reduced address information comprises a bit-mask, wherein a single bit of said bit-mask corresponds to a subset of crossbar buffers, and
    a transmitter sending said incoming packet to said subset of said crossbar buffers connected to said input port by using said reduced address information.

6. The method according to claim 5, wherein said buffered crossbar switch comprises 32 input ports and/or 32 output ports.

7. The method according to claim 5 wherein said subset comprises four adjacent crossbar buffers.

8. The method according to claim 5, wherein the number of output ports is a power of two.

* * * * *